(12) United States Patent
Kim

(10) Patent No.: US 11,403,180 B2
(45) Date of Patent: Aug. 2, 2022

(54) AUXILIARY STORAGE DEVICE HAVING INDEPENDENT RECOVERY AREA, AND DEVICE APPLIED WITH SAME

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 369 days.

(21) Appl. No.: 16/613,486

(22) PCT Filed: Apr. 23, 2018

(86) PCT No.: PCT/KR2018/004690
§ 371 (c)(1),
(2) Date: Nov. 14, 2019

(87) PCT Pub. No.: WO2018/212474
PCT Pub. Date: Nov. 22, 2018

(65) Prior Publication Data
US 2021/0089405 A1    Mar. 25, 2021

(30) Foreign Application Priority Data

May 18, 2017    (KR) ........................ 10-2017-0061381

(51) Int. Cl.
*G06F 12/00*    (2006.01)
*G06F 11/14*    (2006.01)
(Continued)

(52) U.S. Cl.
CPC ...... *G06F 11/1451* (2013.01); *G06F 11/1417* (2013.01); *G06F 11/1435* (2013.01);
(Continued)

(58) Field of Classification Search
None
See application file for complete search history.

(56) References Cited

U.S. PATENT DOCUMENTS

| 2005/0172294 A1 | 8/2005 | Kanemura et al. |
| 2007/0220254 A1 | 9/2007 | Liu |

(Continued)

FOREIGN PATENT DOCUMENTS

| JP | 2008-16001 A | 1/2008 |
| JP | 2011-118704 A | 6/2011 |

(Continued)

OTHER PUBLICATIONS

International Search Report for PCT/KR2018/004690 dated Aug. 23, 2018 [PCT/ISA/210].

(Continued)

*Primary Examiner* — Daniel D Tsui
(74) *Attorney, Agent, or Firm* — Sughrue Mion, PLLC

(57) ABSTRACT

An auxiliary storage device independently has protection and monitoring functions so as to respond to an attempt to take control of a system by a malicious code, and minimize damage to the system. The auxiliary storage device includes a CPU which performs a function to perform protection and monitoring functions independently of an external computing unit; and a storage medium unit. The storage medium unit is divided into a user area in which an OS of a computing unit is stored and the writing and reading to the computing unit is possible at any time, and a recovery area in which a duplicated copy of the OS of the computing unit is stored and the writing and reading of the computing unit is determined according to a selection mode of a mode selection switch. An application device including the auxiliary memory is provided.

8 Claims, 2 Drawing Sheets

(51) Int. Cl.
G06F 21/31 (2013.01)
G06F 21/57 (2013.01)

(52) U.S. Cl.
CPC .......... *G06F 11/1469* (2013.01); *G06F 21/31* (2013.01); *G06F 21/575* (2013.01)

(56) References Cited

U.S. PATENT DOCUMENTS

| | | |
|---|---|---|
| 2012/0066546 A1 | 3/2012 | Kim |
| 2014/0223163 A1* | 8/2014 | Tabone .............. G06F 11/1417 713/2 |

FOREIGN PATENT DOCUMENTS

| | | |
|---|---|---|
| JP | 2014-522070 A | 8/2014 |
| KR | 10-2008-0037211 A | 4/2008 |
| KR | 10-0865568 B1 | 10/2008 |
| KR | 10-2010-0093413 A | 8/2010 |
| KR | 10-2012-0027880 A | 3/2012 |

OTHER PUBLICATIONS

Jian Huang et al., "FlashGuard: Leveraging Intrinsic Flash Properties to Defend Against Encryption Ransomware", ACM SIGSAC Conference on Computer and Communications Security, Oct. 2019, pp. 2231-2244 (14 pages).

\* cited by examiner

AUXILIARY STORAGE DEVICE HAVING INDEPENDENT RECOVERY AREA, AND DEVICE APPLIED WITH SAME

CROSS-REFERENCE TO RELATED APPLICATIONS

This application is a National Phase Application of PCT International Application No. PCT/KR2018/004690, which was filed on Apr. 23, 2018, and which claims priority from Korean Patent Application No. 10-2017-0061381 filed with the Korean Intellectual Property Office on May 18, 2017. The disclosures of the above patent applications are incorporated herein by reference in their entirety.

BACKGROUND

1. Technical Field

The present invention relates to an auxiliary memory device (generally, "auxiliary storage device") having an independent and selectively accessible recovery area to cope with an attempt of a malicious code to occupy a system and to minimize damages to the system, and an application device such as a computer, a mobile phone, etc., to which the auxiliary storage device is applied.

2. Description of the Related Art

Personal computers (PC) or laptop computers using the Windows-based operating system (OS) have hard disk areas for backup of system recovery data. The hard disk area is provided to prepare for a case in which the computer is infected with malicious codes and for a case in which an OS or an application program has a problem due to malicious codes or user errors by backing up software configuration information at a specific point in time such as OS update or backing up files needed for recovery at a point in time that the user specifies.

In order to use a recovery function, a user may make the computer move to a system recovery mode while in OS booting or may execute a system recovery function on the OS. At this time, user files such as word processor files are kept in a current state. Pieces of backup information for recovery are usually stored in a specific area in a hard disk. Some PC manufacturers store pieces of backup information in a partition called "Recovery" which is separately made. However, in an OS like Windows 7 or 10, recovery information is generally stored in a folder called "System Volume Information" made on a hard disk in which the OS is stored.

Such a folder is normally hidden such that only the system can access it but users can't. However, programs designed to gain system privileges, such as GMER, which detect and remove malicious codes such as rootkits can access the folder.

The problem is that it is not difficult to make malicious codes having system privileges, as described above. In particular, recently, encryption of user files and deletion of partitions or folders storing system recovery information by malicious codes such as ransomware are occurring. As described above, access to system files by the malicious codes is possible because, when the malicious codes get the system privileges as a supervising administrator and infect or modify the OS, there is no way to monitor this situation anymore.

In the case in which the entire system is controlled by one OS like the existing computer structure, when malicious codes such as hacking programs or computer viruses take control of the system as a supervising administrator, it is not possible to prevent a configuration of the system from being changed. In addition, it is not possible to cope with when a malicious third-party temporarily gains access so as to harm the system.

In conclusion, in the computers that the OS supports to recover the system, like the current PCs or notebook computers, system recovery information may be deleted by the malicious codes due to the structural vulnerability.

SUMMARY OF THE INVENTION

The present invention is directed to providing an auxiliary storage device having an independent and selectively accessible recovery area to cope with an attempt of a malicious code to occupy a system and to minimize damages to the system, and an application device adopting the same.

In order to solve the above problems fundamentally, it is necessary to develop a computer structure that is completely different from the existing computer structure. However, this is also meaningful if the system may be kept at above a certain level with a simple change in hard disk, operating system (OS), or Basic Input/Output Systems (BIOS) of the existing computers.

An auxiliary storage device (10) according to the present invention comprises a separate central processing unit (CPU) for protection and monitoring tasks independent of a computing unit connected thereto, and a storage medium unit. The storage medium unit is divided into a user area in which an OS of the computing unit (20) is stored and writing and reading of the computing unit (20) is always possible, and a recovery area in which a duplicated copy of the OS of the computing unit (20) is stored and the writing and reading of the computing unit (20) is determined according to a selection mode of a mode selection switch (described below). An auxiliary storage device, which is implemented as a conventional hard disk, already includes a CPU. However, the CPU in such a structure is only responsible for passive input and output of data in response to instructions of the computing unit and does not perform independent protection or monitoring.

However, the auxiliary storage device according to the present invention has an independent recovery area that is accessible only when the user independently provides a permission signal in hardware even when the OS is normally booted and the computing unit operates. Therefore, the recovery area is completely protected even when the OS in the user area is infected with malicious codes to malfunction. In addition, the recovery area may store a duplicated copy or backup of the OS, a duplicated copy or backup of various types of application programs, and a duplicated copy or backup of user files. Therefore, using the above recovery area, it is possible to cope with not only application programs infected with malicious codes but also destruction or infection of the OS or damages of the user files. Further, in a recovery mode, even when there is a request of the computing unit, other application programs except the recovery program may support the recovery of the computing unit using only the OS and the recovery program by refusing to provide data, thereby preparing for re-infection of malicious codes that can exist in the application programs.

One aspect of the present invention provides a device serving as an auxiliary storage device for a computing unit. The auxiliary storage device includes a CPU, a memory unit connected to the CPU, a storage medium unit connected to the CPU, an input and output port (or I/O) device connected to the CPU, a mode selection switch which is connected to the I/O device and switches between a normal mode and a recovery mode, and a communication interface unit configured to provide a connection between the CPU and the computing unit.

The storage medium unit includes a user area in which an OS of a computer is stored and which is connected to the computing unit through the communication interface unit to enable writing and reading of the computer, and a recovery area in which a duplicated copy of the OS of the computer is stored and the writing and reading of the computer is determined according to an input value (a normal mode and a recovery mode) of the mode selection switch. In principle, when the mode selection switch is in a normal mode, the access of the computing unit to the recovery area is completely blocked.

The OS of the computing unit connected through the communication interface is stored in the user area of the storage medium unit, and a duplicated copy of the OS of the computing unit connected through the communication interface is stored in the recovery area of the storage medium unit. In this case, when the mode selection switch is in a recovery mode and the connected computing unit requests information about the OS in the user area, the duplicated copy of the OS stored in the recovery area is provided to the computing unit.

Further, when the computing unit connected through the communication interface unit changes a file in the user area, an original file is stored in the recovery area and the changed file is stored in the user area.

Further, when the computing unit connected through the communication interface accesses a file in the user area, an access time and a file name of the file are stored in a user log file in the recovery area. The user log file may be configured to be readable only when an access password dedicated to the auxiliary storage device is provided.

Further, when the computing unit connected through the communication interface accesses a file in the user area and the file is an executable file, whether to allow access to the file is determined by referring to information stored in a restriction list file in the recovery area.

The auxiliary storage device of the present invention may further include an alarm unit connected to the I/O device.

Further, the auxiliary storage device of the present invention may further include a recovery completion switch connected to the I/O device. Therefore, it is possible to delete files in the recovery area only when the recovery completion switch is turned on.

Another aspect of the present invention provides an application device including a computer such as a PC, a tablet computer, a laptop computer, or the like, or a mobile communication device, such as a personal digital assistant (PDA), a mobile phone, a pager, or the like, to which the auxiliary storage device above described is applied.

In the application device, when the mode selection switch is in the recovery mode and the computing unit connected through the communication interface unit is booted with the duplicated copy of the OS, a recovery dedicated program executed in the connected computing unit may be provided, and executed through an independent execution password. When the user designates a recovery time point, it is possible that the computing unit compares a generation date of a file with respect to the files in the auxiliary storage device for the user to the recovery point by time, finds backup copies of the corresponding file in the recovery area, shows the backup copies to the user, and performs a function to determine whether to recover.

The configuration and operation of the present invention described above will be more apparent through specific embodiments described below with reference to the accompanying drawings.

DETAILED DESCRIPTION OF THE INVENTION

Figure 1:
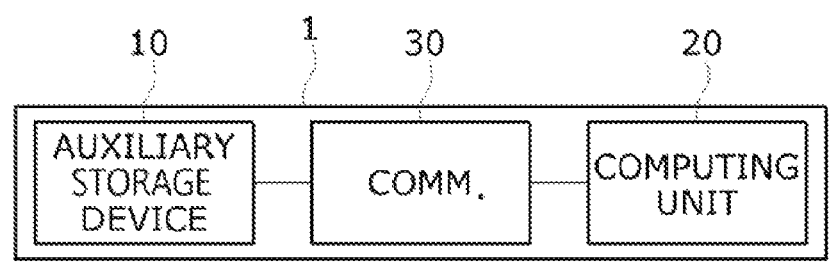
FIG. 1 is a configuration diagram for describing a concept of the present invention.

FIG. 1 is a configuration diagram for describing a concept of the present invention. An auxiliary storage device 10 of the present invention is a device that is employed together with a computing unit 20 in an application device 1 and serves as an auxiliary storage device for the computing unit 20. The auxiliary storage device 10 and the computing unit 20 are connected through a high-speed communication interface unit 30 to perform tasks.

The application device 1 may be a computer, such as a computer such as personal computer (PC), a tablet computer, a laptop computer or the like, a mobile communication device such as a personal digital assistant (PDA), a mobile phone, a pager or the like, or other computer-based device. In the present embodiment, the application device 1 is assumed to be a computer and "a computer having an independent recovery area" will be described.

A central processing unit (CPU) which performs a separate protection function is provided in the auxiliary storage device 10 employed in the computer as an application device 1. In addition, a storage medium unit (described below) in the auxiliary storage device 10 is divided into: a user area in which an OS of the computing unit 20 is stored and writing and reading of the computing unit 20 is always possible; and a recovery area in which a duplicated copy of the OS of the computing unit 20 is stored and the writing and reading of the computing unit 20 is determined according to a selection mode of a mode selection switch (described below).

As a result, it is possible to control and monitor a change or access to a file system in the user area of the auxiliary storage device 10 and to leave the change or access as a log record, thereby strengthening the security. Further, such a record about the security monitoring may be automatically transferred to a communication network through a separate program embedded in a BIOS or an OS while the computing unit 20 is booted, for integrated management.

Figure 2:
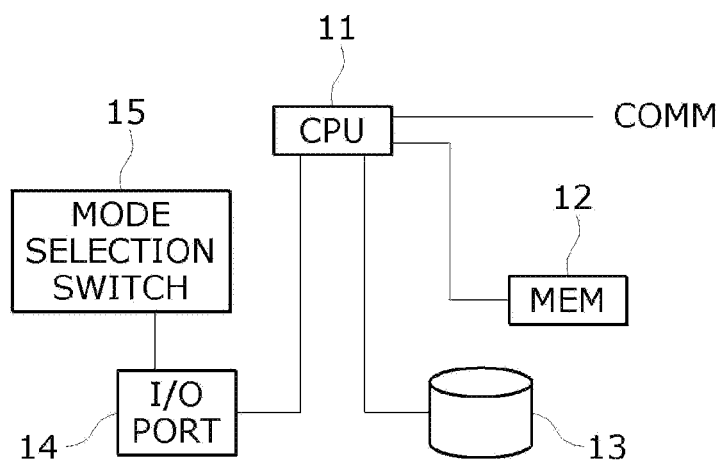
FIG. 2 is a configuration diagram of an auxiliary memory device according to an embodiment of the present invention.

FIG. 2 is a configuration diagram of an auxiliary storage device 10 according to an embodiment of the present invention.

In the present embodiment, the computing unit 20 is assumed to be a computer in which a BIOS, a dynamic random access memory (DRAM), an input device, an output device (such as a display monitor, etc.), and the auxiliary storage device that an OS is stored, may be attached. In this case, the auxiliary storage device 10 according to the present invention, which is connected to the computing unit, includes a CPU 11; a memory unit 12 connected to the CPU 11 such as a random access memory (RAM), a read only memory (ROM), or the like; a storage medium unit 13 connected to the CPU 11; an input and output (I/O) device 14 connected to the CPU 11; a mode selection switch 15 which is connected to the I/O device 14 and selects a normal mode or a recovery mode; and a communication interface unit 30 configured to provide a connection between the CPU 11 and the computing unit 20. The auxiliary storage device 10 of the present invention is recognized as a general auxiliary storage device by the computing unit 20 connected through the communication interface unit 30. Let's assume that the communication interface unit supports an External Serial Advanced Technology Attachment (eSATA) scheme to a hard disk.

Figure 3:
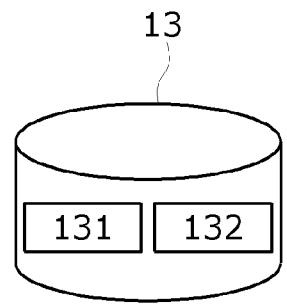
FIG. 3 is a configuration diagram of a storage medium unit (13) of FIG. 2.

Further, the storage medium unit 13, as illustrated in FIG. 3, is divided into a user area 131 in which an OS of the computing unit 20 is stored and writing and reading of the computing unit 20 is always possible and which is connected through the communication interface unit 30, and a recovery area 132 in which a duplicated copy of the OS of the computing unit 20 is stored and the writing and reading of the computing unit 20 is determined according to a selected mode by the mode selection switch 15.

The CPU 11 causes the recovery area 132 to completely block the access of the computing unit 20 when the mode selection switch 15 is selected as a normal mode. That is, in the case that the mode selection switch 15 is in the normal mode, when the computing unit 20 requests to change file information of the user area 131, the CPU 11 of the auxiliary storage device 10 selectively stores original information of a corresponding file and information related to the change in the recovery area 132 according to a type of the file, a folder in which the file is stored, or a partition in which the file is stored by referring to information pre-designated by the user, and then changes the file information of the user area 131.

Meanwhile, in the auxiliary storage device having the independent recovery area according to the present invention, in the case in which the mode selection switch 15 is in the recovery mode, when the system is performing booting operation, the CPU 11 provides the duplicated copy of the OS stored in the recovery area 132 to the computing unit 20.

When the mode selection switch 15 is in the recovery mode and the system proceeds to boot and the computing unit 20 is booted with the duplicated copy of the OS stored in the recovery area 132, the OS may be configured such that the CPU 11 stops execution of other application programs except the OS and automatically executes a recovery program to display on a screen to support the recovery task of the user. In such a case, both of the writing and reading of the computing unit 20 are allowed in the recovery area 132, and in this case, in order to further strengthen the security of the recovery area 132, a separate recovery completion switch 17 may be provided such that the recovery area may be written only when the switch is turned on.

When the recovery task or the management task is completed, the user may change the mode selection switch 15 to the normal mode and restart the computer. Further, if the mode selection switch 15 is changed from the normal mode to the recovery mode during the operation of the computer, the CPU 11 may allow the computing unit 20 only to read the recovery area 132.

A hard disk is generally suitable to the auxiliary storage device 10, but a solid-state drive (SSD) using a semiconductor in the same manner may also be applied to the auxiliary storage device 10.

Further, although the auxiliary storage device 10 of the present invention is preferably configured to divide one storage medium into partitions to use the partitions as the user area 131 and the recovery area 132, in some cases it may be physically composed of separate two storage media or hard disks.

Further, an entire area of the auxiliary storage device 10 may be divided into a recovery area and a user area in units of sectors or files by marking them for recovery or for user. In this case, the file system exposed to the user appears as a single virtual contiguous space, but in reality, the file system is difficult to manage because it is necessary to check who uses each sector. However, in the case in which the computer (i.e., the computing unit 20) changes the file, the CPU 11 in the auxiliary storage device 10 may change and manage attributes of the file or sector only being used by itself when a backup is required, and thus significant time reduction may be obtained when the backup is performed.

Mixing of the two methods described above is also possible. For example, a method may be applied, in which an extension of the existing file is changed to be designated as a file for recovery and the file changed as required by the user is stored, and then the file for recovery is moved to the recovery area 132 at a time when there is no command by the user and the file for recovery of the user auxiliary storage 10 is deleted.

Operations of the computer 1 in which the auxiliary storage device 10 according to the present invention is built in are as follows.

1. Booting

When power is supplied and the booting starts, the CPU 11 of the auxiliary storage device 10 checks the mode selection switch 15. If the mode selection switch 15 is selected to a normal mode, all the operations remain the same as a common auxiliary storage device. That is, only the information stored in the user area 131 are provided to the computing unit 20 without any limitation.

If the mode selection switch 15 is in a recovery mode, the auxiliary storage device 10 provides duplicated copies of the OS stored in the recovery area 132 when the computing unit 20 requests files for OS booting.

Meanwhile, during booting, the OS may receive a value of the mode selection switch 15 from the auxiliary storage device 10 in such a manner that the computing unit reads a value of a specific sector or file. In this case, the OS may automatically block the execution of other application programs except the OS and automatically execute the recovery program, therefore a user interface being configured to be more convenient. If the OS does not receive the value of the mode selection switch 15, a user may execute the recovery program after the OS booting. In this case, the recovery program is preferably executed in a supervising mode of the system. In the recovery mode, it is also possible to block the provision of data by other application programs except the recovery program in order to prevent re-infection through any application program that may occur.

2. Management Method Setting

The auxiliary storage device 10 has a user log file and a usage restriction file in the recovery area 132 and also has a recovery program and a management program which are executed in the computing unit 20. Here, let's assume that the recovery program and the management program are executed by entering separate passwords. The management program may be used in the normal mode. However, it would be safer to execute the management program only in the recovery mode.

For example, an administrator of the system may first execute the management program and specify an executable time or execution duration for each application program. If the executable time is set to "restriction on use," it is not possible to access a corresponding program file. If the executable time is set to a time period of 12:00 to 13:00, a corresponding application program may be available only at this time period. The executable time may be specified using the day of the week or a specific date.

The execution duration is effective, for example, in controlling children's game time at home. For example, if the executable time is a time period of 14:00 to 20:00 and the execution duration is one hour, the user may execute a corresponding application program only for one hour in this executable time period. However, the monitoring of the execution duration should be performed by a real-time monitoring module of the management program in the computing unit.

The administrator may also monitor an access history of files by specifying all the files for each extension, folder, or partition using the management program. For example, when the administrator sets up access monitoring for Microsoft's Word Processor files and PowerPoint files, related information for the corresponding files are recorded in the user log file to be provided to the administrator whenever access is requested.

The real-time monitoring module of the management program may also provide a function of transmitting the pieces of information in real time to a security administrator via a network. In places like enterprises, the security monitoring may be more easily enhanced.

For example, when the computer is already hacked and a hacking program accesses the files, the existing computers cannot detect such a hacked situation immediately; according to the present invention, however, access records remain independent of the hacking program, and thus the security administrator may read the access records to detect the hacked situation.

3. Warning about File Change Attempts

When malicious codes are executed due to careless use of the Internet browser or Universal Serial Bus (USB), the malicious codes attempt to change files on the computer for their own residency. For example, let's assume that the malicious codes attempt to change registry files and driver files of a specific application program. Even when the existing computers have a monitoring function in a real-time monitoring antivirus program, the existing computers cannot prevent the malicious codes from residency because it is possible to evade the monitoring function. However, in the case of the present invention, when in attempting to change the driver file and the registry, the auxiliary storage device 10 notifies the user of the change attempt through an alarm and records the related information in an alarm file of the recovery area 132 which is accessible to the management program.

Figure 4:
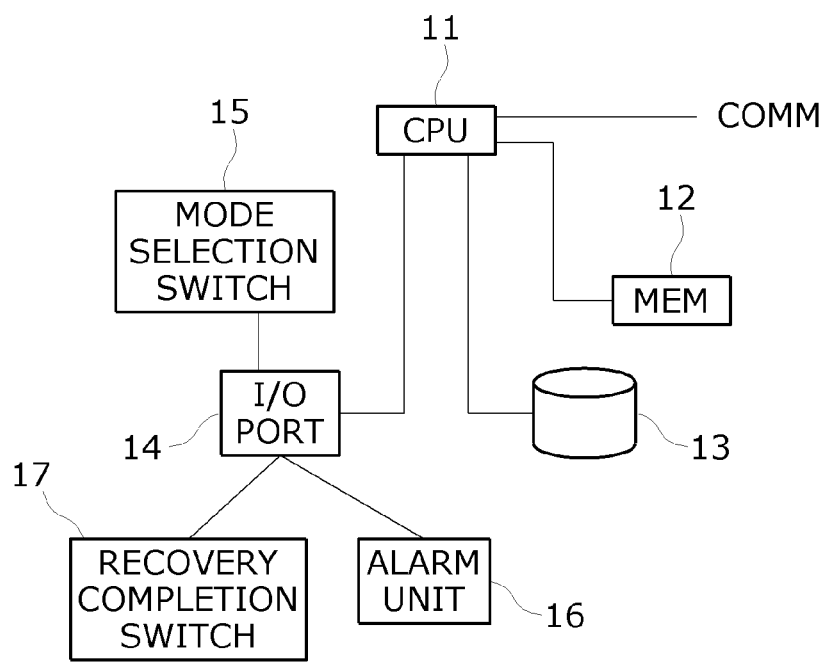
FIG. 4 is a configuration diagram of an auxiliary storage device according to another embodiment of the present invention.

To this end, it can be seen that the alarm unit 16 is connected to the I/O device 14 in a configuration diagram of another embodiment of FIG. 4.

The user alarmed may check the recorded related information by executing the management program to make a primary response. It is also possible to display the alarm on a screen in real time using the real-time monitoring module of the management program. Further, while the management program is running, it is possible to transmit the related contents to a specialized provider such as a vaccine research institute via a network and receive a review result thereof and respond. In this case, since the corresponding information is reviewed at the same time of the appearance of the malicious codes, it is possible to respond rapidly.

4. Malicious Code Infection of Application Program

The existing antivirus program is fundamentally vulnerable to new malicious codes because the antivirus program tries to search them by using specific images of malicious codes. Let's assume that the computer is infected with malicious codes. If the computer is infected with the malicious codes, the malicious codes are already hidden in the file system in the user area of the user's computer and perform a defined malicious action. For example, when it is assumed that the malicious code is ransomware, the ransomware may attempt to encrypt user's word files or working files.

However, in the computer according to the present invention, when a file is changed or deleted, backup images of the corresponding file of a user are stored in the safe recovery area 132, and thus all of the backup images are not deleted as in the existing computer. Therefore, when the user checks the infection, the mode switch may be set to be in the recovery mode and the computer may be booted with the duplicated copy of the OS stored in the auxiliary storage device 10 for recovery, and thus the computer returns to a normal state immediately.

Next, the user may enter a password as an administrator authority to start the recovery program and use the backup copies stored in the recovery area 132 to return the file system to a state before the infection. Therefore, it is possible to recover rapidly and completely from damages caused by the malicious codes. In this case, the backup copies stored in the recovery area 132 may be configured not to be deleted unless the administrator (or the user) confirms with a separate recovery completion switch 17 (see FIG. 4). Therefore, even when recovery point is mistakenly incorrectly setup, the recovery task may be repeated. It can be seen that the recovery completion switch 17 is connected to the I/O device 14 in a configuration diagram of another embodiment of FIG. 4.

In summary, as described above, in the computer according to the present invention, the change or access of the file system of the auxiliary storage device 10 may be controlled and monitored by adding a function for independent protection and monitoring tasks to the auxiliary storage device 10, and thus the change or access is left as a log record, thereby strengthening the security. For example, since the user needs to read an executable file in order to execute a specific application program, the use of the executable file may be stored in the recovery area 132 and restricted. In addition, when a file such as a word processor file or a photograph is read, the file must ultimately be read from the auxiliary storage device 10, and therefore, as far as the access record is left and stored in the recovery area 132 the security may be significantly enhanced.

Further, such a record about the security monitoring may be automatically transferred for integrated management to a communication network through a separate program embedded in a BIOS or an OS when in computer booting. At this time, the access with the recovery mode may preferably have a separate password authentication procedure. Therefore, the present invention is useful in the case in which corporate or military security is required. Further, the computer according to the present invention has a great advantage because it allows parents to easily monitor access of children to restricted contents such as excessively accessing game sites or accessing pornography at home. Further, when the time is not the usage time specified by the parent, the usage may be restricted by blocking the access to the corresponding application program and an access history of the file may be stored during the usage time and then provided. Therefore, the computer may be used under the parent's control.

Meanwhile, in the existing computer, abnormal behavior of the virus is checked later by means of an antivirus program or other means, whereas in the computer according to the present invention, immediate response is possible.

For example, in the existing computer, when a virus penetrates and modifies the file contents to hide in the files stored on the hard disk, the file is modified and then checked with the antivirus program, whereas in the computer according to the present invention, it is possible to monitor the modification of the file in real time. Therefore, when malicious codes attempt to modify files to hide in the files, the independent CPU in the auxiliary storage device 10 may detect such an attempt, notify the user of the modification of the file, and request a response or reject the change of the file according to the configuration.

A real-time monitoring function of antivirus program of the existing computer may be used to block some known viruses but be helpless to block new viruses. What is worse, if the antivirus program is not updated one, the security problem occurs even more. Compared to the existing computer, in the computer according to the present invention, an OS such as Windows may block or warn the file system or registry change by viruses, which may be a more fundamental countermeasure.

According to the present invention, since an auxiliary storage device included in a computer can independently perform a protection task with a separate central processing unit (CPU), it is possible to control and monitor a change or access to a file system of the auxiliary storage device and leave the change or access as a log record, thereby strengthening the security. Further, such a record about the security monitoring can be automatically transferred to a communication network through a separate program embedded in a BIOS or an OS while the computer is booted, for integrated management. Therefore, the present invention is very useful in the case in which corporate or military security is required. Further, the computer according to the present invention has a great advantage because it allows parents to easily monitor access of children to restricted contents such as excessively accessing game sites or accessing pornography.

Further, in the existing computer, abnormal behavior of the virus can be checked later by means of an antivirus program or other means, whereas in the computer according to the present invention, immediate response is possible. Therefore, when malicious codes attempt modification of a file in order to hide in the file, the separate CPU in the auxiliary storage device can detect such an attempt, notify the user of the modification of the file, and request a response or reject the change of the file according to the configuration.

A real-time monitoring function of an antivirus program of the existing computer can be used to block some known viruses but be helpless to block new viruses. When the antivirus program is not updated, the security problem occurs even more. Compared to the existing computer, in the computer according to the present invention, an OS such as Windows can block or warn the file system change or registry change by viruses, which can be a more fundamental countermeasure.

Non-limiting exemplary embodiments of the present invention have been described above. The embodiments may be intentionally deformed, changed, and modified within the scope of the appended claims without departing from the spirit and essence of the invention.

The invention claimed is:

1. An auxiliary storage device for a computing unit connected thereto, the auxiliary storage device comprising:
    a central processing unit (CPU);
    a memory unit connected to the CPU;
    a storage medium unit connected to the CPU;
    an input and output (I/O) device connected to the CPU;
    a mode selection switch which is connected to the I/O device and selects any one of a normal mode and a recovery mode; and
    a communication interface unit configured to provide a connection between the CPU and the computing unit,
    wherein the storage medium unit comprises a user area in which writing and reading of the computing unit is always possible, and a recovery area in which the writing and reading of the computing unit is allowed only when the mode selection switch is in a recovery mode,
    wherein when the mode selection switch is in the normal mode, access of the computing unit to the recovery area is completely blocked, and
    wherein the auxiliary storage device further comprises, when the computing unit connected through the communication interface unit changes a file in the user area, a means for storing the original file and information related to the change in the recovery area and storing the changed file in the user area.

2. The auxiliary storage device of claim 1, wherein:
    an operating system (OS) of the computing unit is stored in the user area of the storage medium unit;
    a duplicated copy of the OS of the computing unit is stored in the recovery area of the storage medium unit; and
    the auxiliary storage device further comprises a means for providing the duplicated copy of the OS stored in the recovery area to the computing unit when the mode selection switch of the auxiliary storage device is in the recovery mode and the computing unit requests data for the OS.

3. The auxiliary storage device of claim 1, further comprising, when the computing unit connected through the communication interface accesses a file in the user area, a means for storing an access time and a file name of the file in a user log file in the user area.

4. The auxiliary storage device of claim 1, further comprising, when the computing unit connected through the communication interface accesses a file in the user area and the file is an executable file, a means for determining whether to allow access to the file by referring to information stored in a restriction list file in the recovery area.

5. The auxiliary storage device of claim 1, further comprising an alarm unit connected to the I/O device.

6. The auxiliary storage device of claim 1, further comprising a recovery completion switch connected to the I/O device, wherein files in the recovery area are deleted only when the recovery completion switch is turned on.

7. An application device comprising:
    an auxiliary storage device which provides data to a computing unit connected thereto or stores the data of the computing unit, comprising
        a central processing unit (CPU) which performs a function for protecting the stored data independent of the computing unit and monitoring access to the data, and an attached memory and an input and output (I/O) device; and a storage medium unit including a user area in which an operating system (OS) of the computing unit is stored and writing and reading of the computing unit is always possible and a recovery area in which a duplicated copy of the OS of the computing unit is stored and the writing and reading of the computing unit is determined according to an input value of a mode selection switch connected to the I/O device, wherein, in the case in which the mode selection switch is in a recovery mode and the computing unit connected through the communication interface unit is booted with the duplicated copy of the OS, when a user designates a recovery point by time, the connected computing unit compares a generation date of a file with respect to files in the auxiliary storage device for the user to the recovery point, finds backup copies of the corresponding file in the recovery area, shows the backup copies to the user, and performs a function to determine whether to recover.

8. The application device of claim 7, wherein:

the CPU provides a value of the mode selection switch to the computing unit by writing the value on an arbitrary file stored in the recovery area; and the OS of the computing unit reads the value, blocks execution of other application programs except the OS when the value is a recovery mode, and automatically executes the recovery program.

* * * * *